United States Patent
Melzer et al.

(10) Patent No.: US 7,524,582 B2
(45) Date of Patent: Apr. 28, 2009

(54) ZINC POWDER OR ZINC ALLOY POWDER FOR ALKALINE BATTERIES

(75) Inventors: Armin Melzer, Dinslaken (DE); Petra Merkel, Bad Harzburg (DE); Jochen Spiestersbach, Duisburg (DE); Rudi Kube, Bad Harzburg (DE); Norbert Schulz, Bad Harzburg (DE)

(73) Assignee: Grillo-Werke AG, Duisburg (DE)

( * ) Notice: Subject to any disclaimer, the term of this patent is extended or adjusted under 35 U.S.C. 154(b) by 331 days.

(21) Appl. No.: 11/422,166

(22) Filed: Jun. 5, 2006

(65) Prior Publication Data

US 2006/0210878 A1    Sep. 21, 2006

Related U.S. Application Data

(62) Division of application No. 10/339,637, filed on Jan. 9, 2003, now abandoned.

(30) Foreign Application Priority Data

Apr. 25, 2002    (EP) .................................. 02009501

(51) Int. Cl.
*H01M 4/42*    (2006.01)

(52) U.S. Cl. ...................... 429/229; 429/230; 429/225; 429/231.9; 429/231.95; 429/231.6; 420/513; 420/514; 420/519; 75/255

(58) Field of Classification Search ................. 429/229, 429/230, 225, 231.9, 231.95, 231.6; 420/513, 420/514, 519; 75/255
See application file for complete search history.

(56) References Cited

U.S. PATENT DOCUMENTS

| 5,240,793 A | * | 8/1993 | Glaeser ....................... 429/229 |
| 6,300,011 B1 | | 10/2001 | Lin et al. |
| 6,521,378 B2 | | 2/2003 | Durkot et al. |

FOREIGN PATENT DOCUMENTS

| JP | 54/98937 | 8/1979 |
| JP | 07/169463 | 7/1995 |
| JP | 09-228079 | 9/1997 |
| JP | 2001-250544 | 3/2000 |
| WO | 00/48260 A1 | 8/2000 |
| WO | 0103209 A1 | 1/2001 |
| WO | WO01/86740 | 11/2001 |

* cited by examiner

*Primary Examiner*—Laura S Weiner
(74) *Attorney, Agent, or Firm*—Sutherland Asbill & Brennan LLP

(57) ABSTRACT

The invention is directed to a zinc powder or zinc alloy powder for alkaline batteries, which powder has a grain size distribution wherein 60 to 100 wt.-% of the particles, relative to the zinc powder or zinc alloy powder, have a diameter of from 40 to 140 μm. The invention is also directed to an alkaline battery.

17 Claims, 2 Drawing Sheets

ZINC POWDER OR ZINC ALLOY POWDER FOR ALKALINE BATTERIES

CROSS REFERENCE TO RELATED APPLICATIONS

This application claims the priority benefit of European Patent Application No. 02 009 501.4 filed on Apr. 25, 2002 and claims the priority benefit of U.S. application Ser. No. 10/339,637 filed on Jan. 9, 2003 now abandoned.

BACKGROUND OF THE INVENTION

1. Field of the Invention

The invention is directed to a zinc powder or zinc alloy powder for alkaline batteries, which powder has a specific grain size distribution, and to an alkaline battery wherein the zinc powders or zinc alloy powders of the invention are employed as electrode.

2. Description of Related Art

A large number of various alloyed zinc powders for use in alkaline batteries have been described in the prior art. Therein, the zinc powders are alloyed in various ways. Conventionally, zinc powders free of mercury, cadmium and preferably also free of lead are used. When used in alkaline batteries, such zinc powders involve the disadvantage of gradual decomposition with evolution of gas as a result of various reaction processes, thereby adversely affecting the durability, shelf life, as well as the electrical properties of the battery. To prevent this, alloys of zinc powder including minor amounts of other metals have mostly been used for battery purposes. Essentially, indium, bismuth, aluminum, magnesium, and calcium are mentioned in the prior art as alloy elements which reduce battery gassing. When used in batteries, these alloy components are added with the aim of obtaining battery gassing as low as possible, thereby increasing the shelf life and safety of the batteries during use.

However, the technical demands on batteries have increased substantially in recent years. In particular, the demands on batteries and their electrical performance have increased considerably as a result of the enormous expansion of mobile appliances in the sector of digital communication and entertainment electronics, such as digital video cameras, cellular phones, CD players, MP-3 players, lap-tops, etc. As a result, attempts are now being made to improve the electrical properties not only by alloy-technological means, but rather, to achieve such improvements by means of special powder distributions, particle shapes and bulk densities of the employed zinc powders or zinc alloy powders. According to the present state of the art, zinc powders or zinc alloy powders are generally used wherein the particle size spans a wide range of about 32-500 μm, the grain size distribution being random.

Thus, WO 00/74157 A1 describes a mixture of zinc powder or zinc alloy powder and a liquid electrolytic medium, wherein the volume of the medium approximately corresponds to the interstices between the particles in dry bulk. These particles have a bulk density less than 2.8 g/cm$^3$. The purpose of this development is to achieve direct contact between virtually all of the particles in a way that sufficient liquid electrolytic medium is still present to dissolve the metal and/or alloy particles, thereby generating electricity.

Similarly, WO 01/03209 A1 describes a mixture of zinc or zinc alloy particles and a liquid electrolytic medium wherein the bulk density is even lower and is about 2.3 g/cm$^3$. Furthermore, metal or metal alloy particles of irregular shape and irregular surface are employed.

WO 99/07030 A1 describes zinc powders or zinc alloy powders for use in alkaline batteries, said zinc or zinc alloys being admixed with varying amounts of extremely fine particles having a size of 200 mesh or less (corresponding to a particle diameter of ≦74 μm). Such admixture of fine zinc particles has been found to result in an improvement in the electrical properties of the battery, particularly an improvement in the maximum discharge rate. Said rate defines the period of time within which electric voltage can be obtained from a battery under load, with no drop of the battery voltage below a specific value. This quantity is particularly important for uses in the high-power sector, particularly in cellular phones and other electronic products which normally measure the battery voltage and signal the user in case of a voltage drop under load. Frequently, however, this may be the reason for untimely and unnecessary replacement of the batteries despite sufficiently available capacity.

The demands on zinc powders and zinc alloy powders for use in electric batteries vary considerably, and to date, no success has been made in developing a zinc powder or a zinc alloy powder that achieves an improvement in all of the test procedures and, in particular, has low battery gassing. For example, this can also be seen in the WO 99/07030 described above. In the examples described therein, battery gassing of zinc powders and zinc alloy powders suitable for high-power uses has not been investigated, and it must be assumed that the battery properties are not optimal.

SUMMARY OF THE INVENTION

It was therefore the technical object of the invention to provide a zinc powder or zinc alloy powder which has outstanding electrical properties for use in alkaline batteries and, in particular, also has low battery gassing.

Said object is accomplished by means of a zinc powder or zinc alloy powder for alkaline batteries, which powder has a grain size distribution wherein 60 to 100 wt.-% of the particles, relative to the zinc powder or zinc alloy powder, have a particle diameter of from 40 to 140 μm, In a preferred embodiment, the grain size distribution is such that 75 to 95 wt.-% of the particles, relative to the zinc powder or zinc alloy powder, have a diameter of from 40 to 140 μm. The grain size distribution was determined according to ASTM B 214.

It is also preferred that the zinc powder or zinc alloy powder according to the invention has a bulk density ranging from 2.9 to 4.5 g/cm$^3$, preferably from 3.2 to 4.0 g/cm$^3$. The bulk density was determined according to ASTM B 212.

In another preferred embodiment, the zinc powder or zinc alloy powder of the invention has a percentage of particles with a diameter of <40 μm below 10 wt.-%, preferably below 5 wt.-%, and most preferably below 4 wt.-%, relative to the zinc powder or zinc alloy powder. It is also preferred that the zinc powder or zinc alloy powder particles having a diameter of up to 100 μm are spherical in shape. Due to the production conditions, the spherical particle shape increases with decreasing particle size, i.e., particles smaller than 100 μm, preferably <71 μm, are remarkable for their nearly spherical particle shape. It is this particular particle shape which, inter alia, is one reason for the highly favorable gassing properties of the zinc powder or zinc alloy powder according to the invention.

The following figures are intended to illustrate the size and shape of the zinc particles. The FIGS. 1 to 4 show electronmicroscopic images of unscreened zinc alloy powders subsequent to production in their original state.

DETAILED DESCRIPTION OF THE INVENTION

Figure 1:
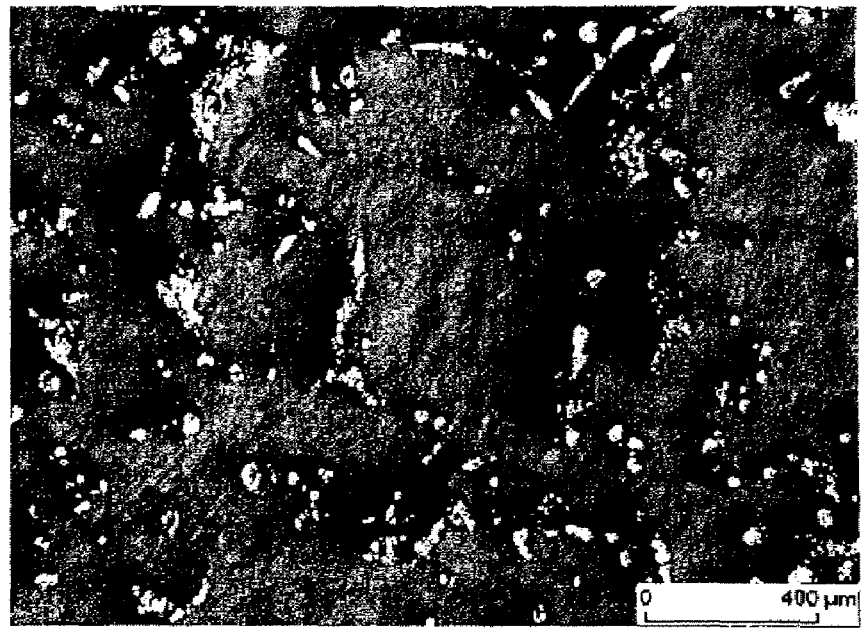
FIG. 1 is an exemplary illustration of the zinc powder according to the invention in its overall distribution, which is not in relation to the real quantitative distribution.
Figure 2:
FIG. 2 illustrates the fraction >71 µm of the zinc powder according to the invention, not in relation to the real quantitative distribution, which is remarkable for its relatively irregular particle shape.
Figure 3:
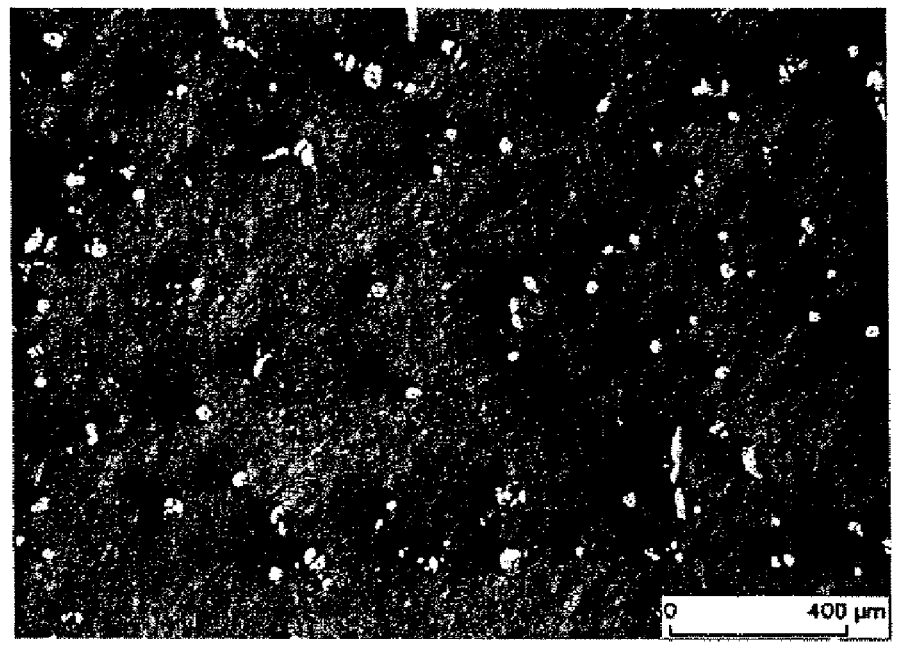
FIG. 3 illustrates the fraction <71 µm of the zinc powder according to the invention, not in relation to the real quantitative distribution, which is remarkable for its highly spherical particle shape.
Figure 4:
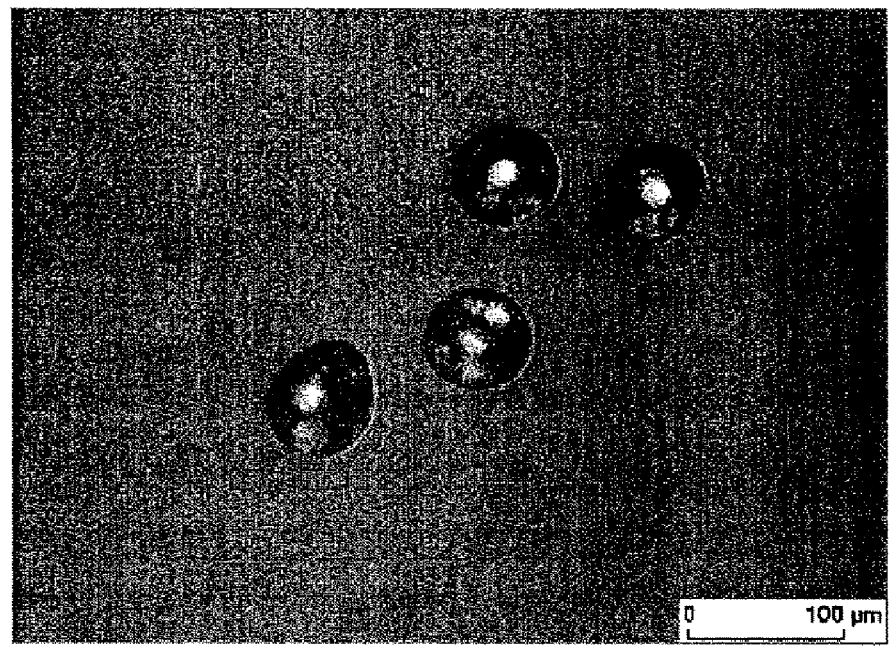
FIG. 4 illustrates individual spherical particles of the fraction <71 µm of the zinc powder according to the invention, with no relation to the real quantitative distribution.

In a particularly preferred embodiment the zinc powder or zinc alloy powder of the invention has the following grain size distribution, all these data being relative to the total amount of zinc powder and zinc alloy powder:

| | |
|---|---|
| 0-10 wt.-% | <40 µm |
| 15-40 wt.-% | 40 to 71 µm |
| 24-40 wt.-% | 71 to 100 µm |
| 10-40 wt.-% | 100 to 140 µm |
| 0-20 wt.-% | >140 µm. |

In these embodiments, the bulk density is from 3.2 to 4.0 g/cm$^3$ in particularly preferred variants.

Grain size distribution in the meaning of the invention is understood to be the distribution of the particle size in the zinc powder or zinc alloy powder, the size of the particles being specified as diameter in µm. The grain size distribution was determined according to ASTM B 214. In the meaning of the invention, bulk density is understood to be the quotient of mass and occupied volume which also includes interstices and additional cavities, if present. Said bulk density is measured according to ASTM B 212.

When referring to zinc powder or zinc alloy powder in the present invention, types of zinc will be used which, with respect to their purity, are suitable for battery uses in accordance with the prior art. Conventional types of zinc being used have a purity of 99.99%, 99.995% or 99.999%. Alloy data given in this application refer to the amount of alloying elements, i.e., not to impurities possibly present in the zinc powder. The quantities given in context with the zinc alloys are to be taken such that the respective amount of alloy element is alloyed, with the remainder being zinc.

The zinc powder or zinc alloy powder according to the invention has a specific grain size distribution which is within an exceedingly narrow range for battery powders. It has outstanding electrical properties, particularly when used in alkaline batteries. Compared to conventional prior art zinc powders, battery gassing is lower by a factor of about 2 to 20, resulting in a substantially increased durability and shelf life of alkaline batteries employing the zinc powders or zinc alloy powders according to the invention.

With respect to alloy technology, the zinc powder is not restricted in any way and thus, indium, bismuth, lead, aluminum, calcium, lithium, sodium, and magnesium, or mixtures thereof can be used as alloy elements for zinc powders. In a preferred fashion, one or more alloy elements are included in the following amounts: indium 0.1 to 1200 ppm, bismuth 0.1 to 1000 ppm, lead 0.1 to 1000 ppm, aluminum 0.1 to 200 ppm, calcium 0.1 to 200 ppm, lithium 0.1 to 200 ppm, sodium 0.1 to 200 ppm, magnesium 0.1 to 200 ppm.

The following alloys are particularly preferred: a) 0.1 to 1200 ppm indium, preferably 100 to 850 ppm indium, and 0.1 to 1000 ppm bismuth, preferably 50 to 500 ppm bismuth.

Also preferred is alloy b) including 0.1 to 1200 ppm indium, preferably 100 to 500 ppm indium, and 0.1 to 1000 ppm bismuth, preferably 50 to 500 ppm bismuth, and 0.1 to 1000 ppm lead, preferably 400 to 600 ppm lead.

Furthermore, alloy c) including 0.1 to 1000 ppm lead, preferably 400 to 600 ppm lead, and 0.1 to 1000 ppm indium, preferably 100 to 850 ppm indium, is particularly preferred.

An alloy d) including 0.1 to 1000 ppm lead, particularly 400 to 600 ppm lead, is also preferred as alloy.

In a particularly preferred embodiment, the alloys a) to d) may include minor amounts of alkali metals, particularly 0.1 to 200 ppm lithium and/or 0. 1 to 200 ppm sodium.

The remainder in the alloy data given above is zinc.

Investigations have shown that alloying the aforementioned elements does not cause any disadvantages with respect to the electrical properties or battery gassing properties. The zinc powder of the invention can even be used as a lead-free powder for all uses and battery types. Battery tests on the zinc powder or zinc alloy powder with no lead used as alloy element have shown that gassing is extremely low particularly in alkaline round cell types, and that this also applies to cell types of size C and D of the international classification.

Thus, the zinc powder is suitable for use in all alkaline round cells of the international types AAAA, AAA, AA, C, D, etc., as well as for all types of button cells wherein zinc powders or zinc alloy powders are used. For example, these include zinc/air button cells, alkaline manganese button cells and zinc/silver oxide button cells. For use in button cells, amalgamated zinc powder still is frequently employed which contains mercury in amounts of about 0.15 to 7 wt.-%. If such an amalgamation is desired, the zinc powder or zinc alloy powder can be subjected to an additional surface amalgamation. Owing to its low gassing, however, the powder can also be used with no mercury added, in which case the mercury content is below 1 ppm.

In a preferred embodiment, it is also possible to combine the zinc powder or zinc alloy powder with other, conventional zinc powders or zinc alloy powders of the prior art, thereby creating double distributions. Such double distributions result in very good high-power properties in the battery. The second zinc powder should have a grain size distribution as present in powders or zinc alloy powders conventional for batteries.

At present, zinc powders or zinc alloy powders are conventionally used according to the state of the art, wherein the particle size is in a wide range of about 32 to 500 µm. In a preferred fashion, the grain size distribution of the zinc powder or zinc alloy powder of the invention as measured according to ASTM B 214 should be in a range of from 75 to 500 µm.

For a fine type of powder, the zinc powder of the invention is very low in fines including particles with a diameter of <40 µm, and this is a substantial advantage over zinc powders or zinc alloy powders according to the prior art which, as a rule, are much higher in fines of <40 µm. It has been determined that it is precisely this higher amount of fines that gives rise to increased battery gassing. More specifically, however, there is no increase in battery gassing when admixing the zinc powder or zinc alloy powder of the invention. Consequently, there is no limitation in the mixing ratio of these zinc powders or zinc alloy powders. Depending on the desired battery properties, the mixing ratio can be adjusted in a controlled fashion.

When using the zinc powder of the invention, the positive effect on the battery properties can be determined unequivocally upon addition of only 5 wt.-% of the zinc powder according to the invention.

The production of the zinc powder or zinc alloy powder proceeds in a per se known fashion. The zinc or zinc alloy particles are produced from liquid zinc or liquid zinc alloys according to various methods. For example, spraying or granulating on a rotating granulator plate is effected, whereby grain size, grain size distribution and outer shape of the particles can be adjusted depending on the process conditions. Where specific grain size distributions are desired, it is also possible to set up appropriate screen fractions including the individual particles with the respective grain size distribution. These particles can be remixed at a desired grain size distribution and bulk density. Frequently, screen fractions are separated from oversize and undersize. Another method of producing zinc powder has been described in detail in WO 00/48260 A1, In a preferred fashion, the zinc powder or zinc alloy powder of the invention is used in alkaline cells. Such alkaline cells are well-known in the art and have been described in WO 99/07030, for example. These alkaline cells normally have an anode made of zinc powder or zinc alloy powder and cathodes made of manganese dioxide or other materials such as air or silver oxide. For an anode, the alkaline zinc alloy powder is solidified in an electrolyte liquid using well-known gelating agents or other additives in order to stabilize the particulate zinc or particulate zinc alloy and obtain a preferably ideal distribution within the electrode.

The zinc powder or zinc alloy powder of the invention has an exceedingly narrow grain size range and can be used for batteries in all alkaline round cells and button cells. In a preferred fashion, it has a high bulk density and—for a relatively fine type of powder—a very low amount of fines, thereby substantially enhancing the improvement in the gassing properties. Furthermore, the zinc powder or zinc alloy powder of the invention achieves low battery gassing even without addition of lead, cadmium and mercury as alloy elements, thus providing a powder which can be used universally in all alkaline battery types.

The following examples are intended to illustrate the invention in more detail:

EXAMPLES

Zinc powders including various alloy components were produced. Battery tests on LR14 (C) cells were performed. In all of the cases, the cells showed outstanding battery properties compared to standard zinc powders, and battery gassing was significantly lower in all of the cases. Gassing was determined following an ON discharge of from 40 to 270 minutes at 2 ohms and subsequent storage of the batteries for 7 days at 70° C. In all of the cases, gassing was at values of below 4 ml gas/cell. Particularly remarkable were the exceedingly low gassing values in the 40 minutes discharge, which likewise were below 4 ml per cell. In contrast to a standard zinc powder, an improvement by a factor of up to 20 was achieved.

In addition, a standard gassing (out-of-cell gas test) was performed. To this end, 25 g of zinc powder was placed in a glass flask together with 135 ml of 36% KOH and 4% ZnO. Evolution of hydrogen was determined after 5 days at 70° C. The gassing values of the zinc powder according to the invention were in the range of the standard zinc powder, but significantly lower than those of the fine standard zinc powder.

The flow rate was measured according to ASTM B213 (50 g 1/10" No. 1-2288) and, as expected, was at very low time values due to the high bulk density.

The following Table 1 shows the properties of zinc alloy powders of the invention compared to the properties of a fine standard zinc alloy powder in Table 2 and the properties of normal standard zinc alloy powder in Table 3.

TABLE 1

| Alloy ppm | <40 μm | 40-71 μm | 71-100 μm | 100-140 μm | >140 μm | Bulk density g/cm³ | Flow rates | LR 14 gassing ml 270 min | LR 14 gassing ml 40 min | Standard 5 days 70° C. ml |
|---|---|---|---|---|---|---|---|---|---|---|
| 200In/200Bi (Type 1) | 9 | 40 | 24 | 22 | 5 | 3.58 | 25.7 | 4.0 | 2.1 | 1.7 |
| 200In/200Bi (Type 2) | 4 | 36 | 39 | 16 | 5 | 3.53 | 26.3 | 3.7 | 1.9 | 1.4 |
| 300In/500Pb (Type 1) | 4 | 30 | 29 | 34 | 4 | 3.3 | 29.0 | 3.4 | 2.1 | 3.5 |
| 300In/500Pb (Type 2) | 4 | 17 | 26 | 37 | 16 | 3.7 | 23.8 | 3.4 | 3.3 | 3.6 |
| 500In/500Bi/ 500Pb (Type 1) | 4 | 24 | 32 | 30 | 10 | 3.5 | 24.4 | 3.0 | 3.0 | 1.5 |
| 500In/500Bi/ 500Pb (Type 2) | 4 | 28 | 32 | 27 | 9 | 3.5 | 26.8 | 1.2 | 2.1 | 1.9 |
| 500In/500Bi/ 500Pb (Type 3) | 6 | 49 | 33 | 10 | 2 | 3.6 | 20.2 | 2.0 | 2.4 | 1.3 |
| 500In/500Bi/ 500Pb (Type 4) | 4 | 39 | 36 | 18 | 3 | 3.8 | 19.6 | 2.0 | 2.2 | 1.1 |
| 500Pb | 3 | 34 | 29 | 29 | 5 | 3.5 | 26.0 | 2.2 | 1.6 | 1.4 |

TABLE 2

| Alloy ppm | <40 μm | 40-71 μm | 71-100 μm | 100-140 μm | >140 μm | Bulk density g/cm³ | Flow rates | LR 14 gassing ml 270 min | LR 14 gassing ml 40 min | Standard 5 days 70° C. ml |
|---|---|---|---|---|---|---|---|---|---|---|
| 300In/300Bi | 20 | 36 | 31 | 13 | 0 | 2.8 | 34.7 | 4.1 | 10.1 | 24.6 |
| 500In/500Bi/500Pb | 25 | 67 | 8 | 0 | 0 | 2.7 | 33 | 5.4 | 8.8 | 17.5 |

TABLE 3

| Alloy ppm | <40 μm | 40-71 μm | 71-100 μm | 100-140 μm | >140 μm | Bulk density g/cm³ | Flow rates | LR 14 gassing ml 270 min | LR 14 gassing ml 40 min | Standard 5 days 70° C. ml |
|---|---|---|---|---|---|---|---|---|---|---|
| 300In/300Bi | 15 | 37 | 34 | 14 | 0 | 2.8 | 44.3 | 8.1 | 20.3 | 1.2 |
| 500In/500Bi/500Pb | 6 | 30 | 37 | 26 | 1 | 2.8 | 53.2 | 5.2 | 17.2 | 0.7 |

TABLE 4

| | Table 1 | | | | | |
|---|---|---|---|---|---|---|
| Alloy ppm | <40 μm | 40-71 μm | 71-100 μm | 100-140 μm | >140 μm | d50 |
| 200In/200Bi (Type 1) | 9 | 40 | 24 | 22 | 5 | 72 |
| 200In/200Bi (Type 2) | 4 | 36 | 39 | 16 | 5 | 78 |
| 300In/500Pb (Type 1) | 4 | 30 | 29 | 34 | 4 | 85 |
| 300In/500Pb (Type 2) | 4 | 17 | 26 | 37 | 16 | 103 |
| 500In/500Bi/500Pb (Type 1) | 4 | 24 | 32 | 30 | 10 | 90 |
| 500In/500Bi/500Pb (Type 2) | 4 | 28 | 32 | 27 | 9 | 85 |
| 500In/500Bi/500Pb (Type 3) | 6 | 49 | 33 | 10 | 2 | 66 |
| 500In/500Bi/500Pb (Type 4) | 4 | 39 | 36 | 18 | 3 | 74 |
| 500Pb | 3 | 34 | 29 | 29 | 5 | 82 |

TABLE 5

| | Example | | | | |
|---|---|---|---|---|---|
| Alloy ppm | | | wt.-% | | |
| 200In/200Bi (Type 1) | <40 μm | <71 μm | <100 μm | <140 μm | <180 μm |
| | 9 | 49 | 73 | 95 | 100 |

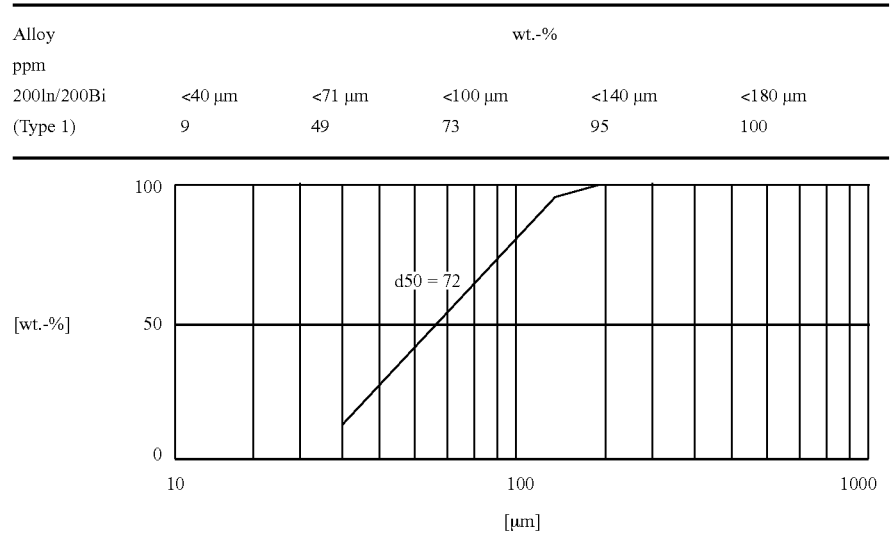

The invention claimed is:

1. A zinc powder or zinc alloy powder for alkaline batteries, which powder has a grain size distribution wherein 75 to 95 wt % of the particles, relative to the zinc powder or zinc alloy powder, have a diameter of from 40 to 140 μm and the amount of particles having a diameter of <40 μm is less than 10 wt %, relative to the zinc powder or zinc alloy powder and wherein those particles having a diameter of from 40 to 100 μm have a spherical particle shape.

2. The zinc powder or zinc alloy powder according to claim 1, wherein the bulk density is in a range of from 2.9 to 4.5 g/cm$^3$.

3. The zinc powder or zinc alloy powder according to claim 2, wherein the bulk density is in a range of from 3.2 to 4.0 g/cm$^3$.

4. The zinc powder or zinc alloy powder according to claim 3, wherein the amount of particles having a diameter of <40 μm is less than 5 wt %, relative to the zinc powder or zinc alloy powder.

5. The zinc powder or zinc alloy powder according to claim 1 wherein those particles having a diameter of from 40 to 71 μm, have a spherical particle shape.

6. The zinc powder or zinc alloy powder according to claim 1 wherein the alloy contains metals selected from the group consisting of indium, bismuth, lead, aluminum, calcium, lithium, sodium, magnesium, and mixtures thereof are included as alloy elements.

7. The zinc powder or zinc alloy powder according to claim 6, wherein one or more alloy elements selected from the following group of metals can be included in the following amounts: 0.1 to 1200 ppm indium, 0.1 to 1000 ppm bismuth, 0.1 to 1000 ppm lead, 0.1 to 200 ppm aluminum, 0.1 to 200 ppm calcium, 0.1 to 200 ppm lithium, 0.1 to 200 ppm sodium, and 0.1 to 200 ppm magnesium.

8. The zinc powder or zinc alloy powder according to claim 6, wherein the powder includes 0.1 to 1200 ppm indium and 0.1 to 1000 ppm bismuth.

9. The zinc powder or zinc alloy powder according to claim 6, wherein the powder includes 0.1 to 1200 ppm indium, 0.1 to 1000 ppm bismuth, and 0.1 to 1000 ppm lead.

10. The zinc powder or zinc alloy powder according to claim 6, wherein the powder includes 0.1 to 1000 ppm lead and 0.1 to 1000 ppm indium.

11. The zinc powder or zinc alloy powder according to claim 10, wherein the powder additionally includes 0.1 to 200 ppm lithium and/or 0.1 to 200 ppm sodium.

12. The zinc powder or zinc alloy powder according to claim 10 wherein the zinc powder is an amalgamated zinc powder.

13. The zinc powder or zinc alloy powder according to claim 12, wherein the zinc powder is amalgamated with 0.1 to 7 wt % Hg.

14. The zinc powder or zinc alloy powder according to claim 6, wherein the powder includes 0.1 to 1000 ppm lead.

15. The zinc powder or zinc alloy powder according to claim 6, wherein the powder includes 0.1 to 1000 ppm indium, 0.1 to 1000 ppm bismuth, and 0.1 to 200 ppm aluminum.

16. A method of use of ≧5 wt % zinc powder or zinc alloy powder according to claim 1 comprising combining said ≧5 wt % zinc powder or zinc alloy powder with conventional zinc powders or zinc alloy powders as anode active material.

17. A method of use of the zinc powder according to claim 1 comprising applying said zinc powder as an anode for an alkaline battery.

* * * * *